US011012850B1

(12) United States Patent
Zhu

(10) Patent No.: US 11,012,850 B1
(45) Date of Patent: May 18, 2021

(54) METHOD AND APPARATUS FOR APPLICATION DATA PATH SELECTION ON DUAL SIM DEVICE

(71) Applicant: MOTOROLA MOBILITY LLC, Chicago, IL (US)

(72) Inventor: Xiaofeng Zhu, Nanjing (CN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/749,821

(22) Filed: Jan. 22, 2020

(30) Foreign Application Priority Data

Dec. 31, 2019 (CN) .......................... 201911418850.2

(51) Int. Cl.
*H04W 12/45* (2021.01)
*H04W 8/18* (2009.01)
*H04W 88/06* (2009.01)
*H04W 8/20* (2009.01)
*H04W 64/00* (2009.01)
*H04W 28/24* (2009.01)
*H04W 4/029* (2018.01)
*H04W 4/60* (2018.01)

(52) U.S. Cl.
CPC ........... *H04W 8/183* (2013.01); *H04W 4/029* (2018.02); *H04W 4/60* (2018.02); *H04W 8/205* (2013.01); *H04W 28/24* (2013.01); *H04W 64/003* (2013.01); *H04W 88/06* (2013.01)

(58) Field of Classification Search
CPC ....... H04W 8/18; H04W 12/004; H04W 48/18; H04W 12/00401; H04W 12/45
See application file for complete search history.

(56) References Cited

U.S. PATENT DOCUMENTS

2009/0239576 A1*  9/2009  Liao ..................... H04M 15/771
                                                                   455/552.1
2011/0081951 A1*  4/2011  Hwang ................. H04W 8/183
                                                                   455/558

* cited by examiner

*Primary Examiner* — Tu X Nguyen
(74) *Attorney, Agent, or Firm* — Isidore PLLC

(57) ABSTRACT

A wireless communication device includes at least two SIMs, including a first SIM and a second SIM. The device includes a memory storing multiple mobile applications for performing data operations. The device includes a processor coupled to each of the at least two SIMs, and the memory. The processor executes program code that enables the device to: select a mobile application to run. The program code further enables the wireless communication device to: identify a user-created setting that specifies one of the at least two SIMs as a preferred SIM to which the selected mobile application is assigned. The program code further enables the wireless communication device to: channel data operations associated with the selected mobile application to a data path of the preferred SIM specified in the user-created setting.

20 Claims, 7 Drawing Sheets

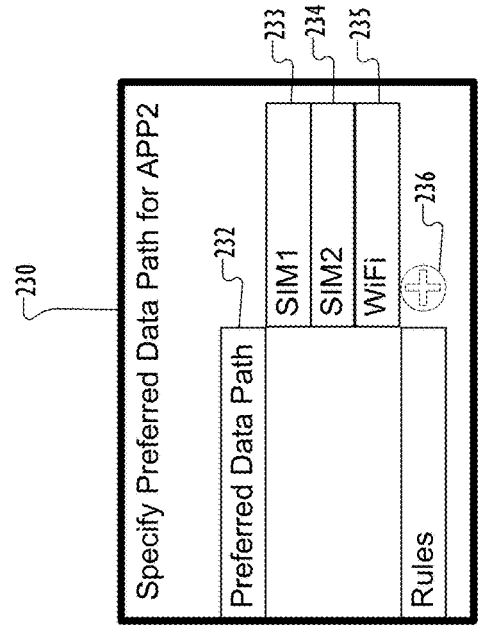
FIG. 2C
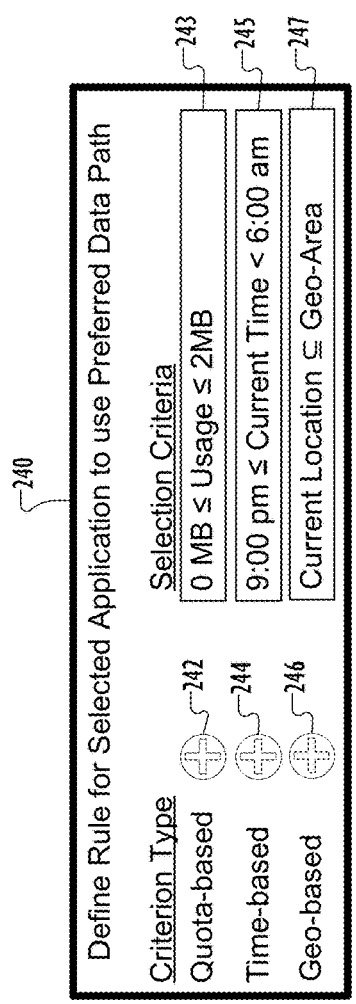
FIG. 2D
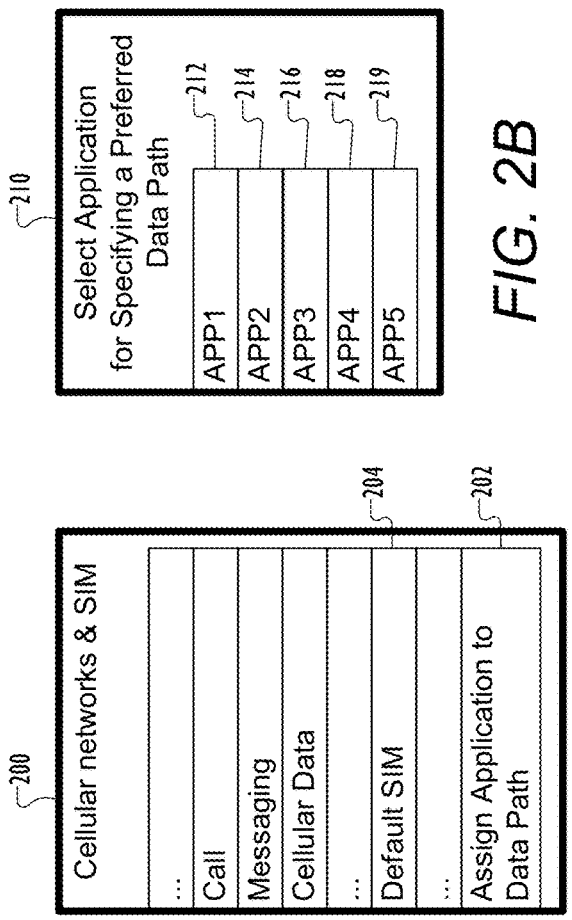
FIG. 2A
FIG. 2B
FIG. 2E

METHOD AND APPARATUS FOR APPLICATION DATA PATH SELECTION ON DUAL SIM DEVICE

CLAIM TO FOREIGN PRIORITY

This application claims priority to Chinese Application No. 201911418850.2 filed Dec. 31, 2019, the content of which is fully incorporated herein by reference.

BACKGROUND

1. Technical Field

The present disclosure generally relates to mobile devices with multiple subscriber identity modules (SIMs), and more particularly to selectively channeling data operations in a mobile device having multiple SIMs.

2. Description of the Related Art

Dual-SIM mobile devices are becoming more common. These dual-SIM devices include a first SIM associated with a first carrier network (e.g., CDMA network, or GSM/GPRS network) and a second SIM associated with a second carrier network (e.g., CDMA network or GSM/GPRS network). In the settings of a dual-SIM mobile device, a default SIM is selected from among the first and second SIMs. Once the default SIM is set, the mobile device automatically channels all data operations through the default SIM.

Wireless service providers compete for customers and subscriptions by offering discounts and subsidies on wireless communication services. Example discounts include quota-based discounts on data communications within a pre-determined range of digital storage (measured in either bits or bytes) per billing cycle, time-based discounts on data communications that occur within a pre-determined period of time, and application-specific discounts on data communications associated with a pre-determined mobile application. To take advantage of these types of discounts, the user of the mobile device would have to change default SIM settings multiple times per billing cycle based on when his/her data consumption is within a pre-determined range of digital storage. The user may have to change default SIM settings multiple times per day based on the pre-determined period of time and before opening the pre-determined mobile application.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 2A-2E illustrate example Application-to-Data Path settings menus for user-assigning a selected one of the multiple data paths of the mobile device of FIG. 1 as a preferred data path for a selected mobile application, in accordance with one or more embodiments of this disclosure;

DETAILED DESCRIPTION

Figure 1A:
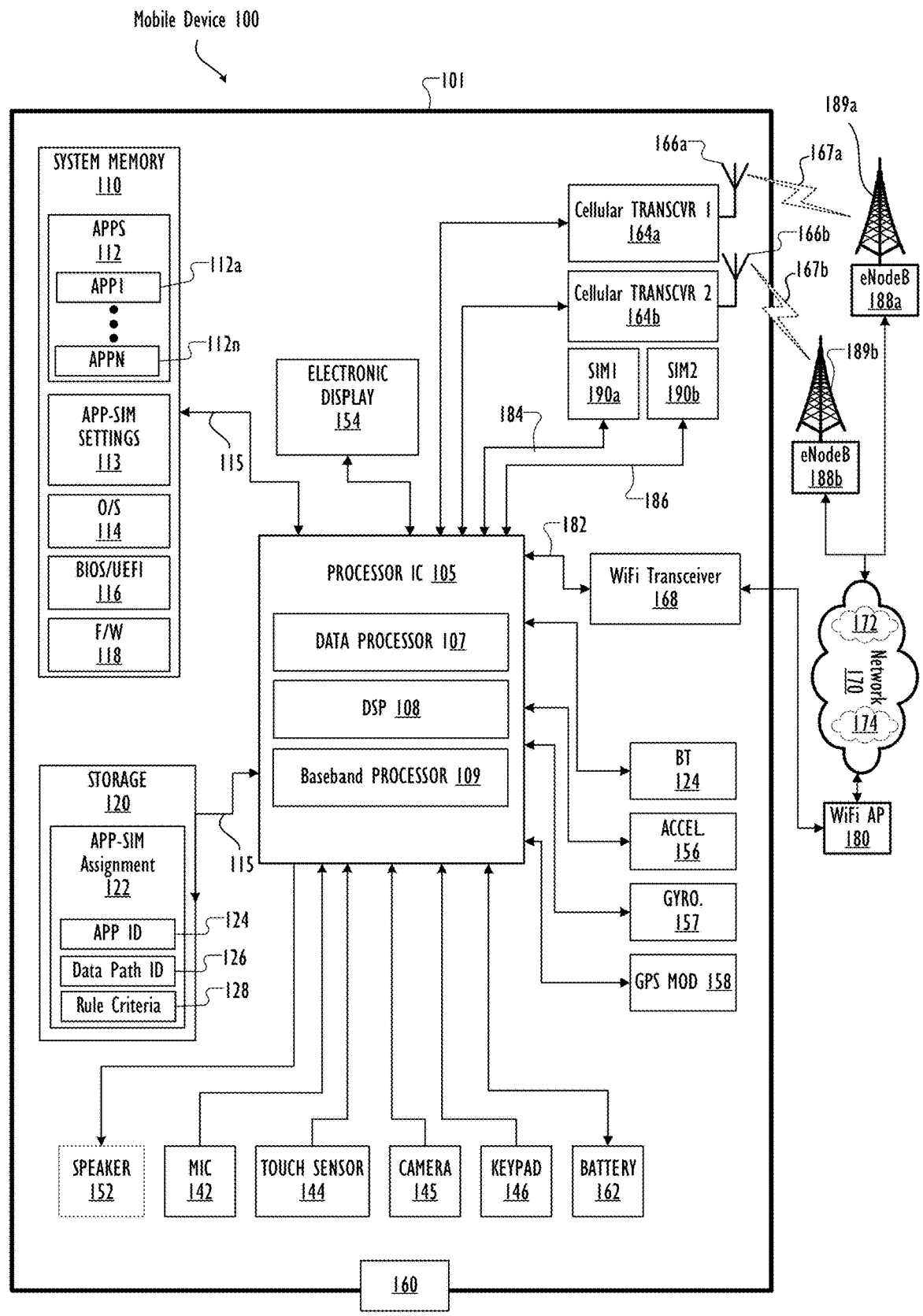
FIG. 1A is a block diagram representation of an example multi-SIM mobile device within which certain aspects of the disclosure can be practiced, in accordance with one or more embodiments of this disclosure.

The illustrative embodiments describe a method, a wireless communication device, and a computer program product for selectively channeling data operations associated with a selected mobile application to a data path of a preferred subscriber identification module (SIM) that is specified in an identified user-created setting.

According to one aspect, the wireless communication device includes at least two SIMs, including a first SIM and a second SIM. The wireless communication device also includes at least one electronic display and a memory storing multiple mobile applications for performing data operations. The wireless communication device further includes a processor coupled to each of the at least two SIMs, the at least one electronic display, and the memory. The processor executes program code that enables the wireless communication device to select a mobile application to run and identify a user-created setting that specifies one of the at least two SIMs as a preferred SIM to which the selected mobile application is assigned. The program code further enables the wireless communication device to channel data operations associated with the selected mobile application to a data path of the preferred SIM specified in the user-created setting.

According to another aspect of the disclosure, a method is provided within a wireless communication device having dual SIMs. The method includes selecting a mobile application to run on the wireless communication device. The method includes identifying a user-created setting that specifies one of the at least two SIMs as a preferred SIM to which the selected mobile application is assigned. The method includes channeling data operations associated with the selected mobile application to a data path of the preferred SIM specified in the user-created setting.

According to one additional aspect of the disclosure, a computer program product is provided that includes a non-transitory computer readable storage device and program code on the computer readable storage device that when executed by a processor associated with an electronic device, the program code enables the electronic device to provide functionality according to the present disclosure. The electronic device includes dual SIMs. The computer program product code enables the electronic device to provide the functionality of selecting a mobile application to run on the electronic device. The computer program product code also enables the electronic device to provide the functionality of identifying a user-created setting that specifies one of the at least two SIMs as a preferred SIM to which the selected mobile application is assigned. The computer program product code also enables the electronic device to provide the functionality of channeling data operations associated with the selected mobile application to a data path of the preferred SIM specified in the user-created setting.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1B:
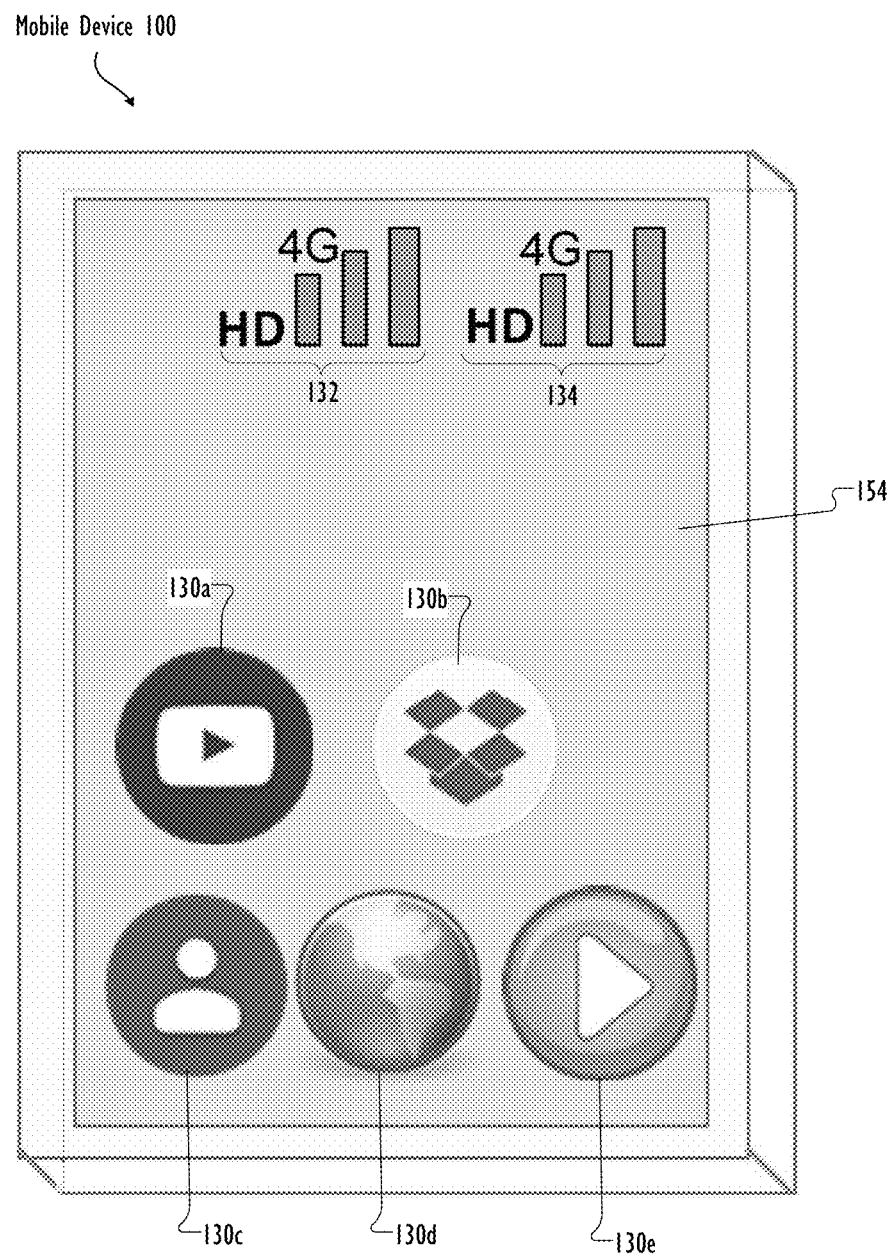
FIG. 1B illustrates an example three-dimensional structure of the dual-SIM mobile device of FIG. 1A within which certain aspects of the disclosure can be practiced, in accordance with one or more embodiments of this disclosure.

FIG. 1A is a block diagram representation of an example multi-SIM mobile device 100, within which one or more of the described features of the various embodiments of the disclosure can be implemented. Mobile device 100 of FIG. 1 is depicted as a two-dimensional block diagram; however, it is understood that mobile device 100 is physically configured as a three-dimensional device, as illustrated by FIG. 1B. The description of certain physical attributes of mobile device 100 will be described with reference to those components within FIG. 1B. As shown by FIGS. 1A-1B, mobile device 100 includes functional compute components encased in an external casing (namely, housing 101) to form a dual-SIM mobile device 100 (FIG. 1B). Mobile device 100 may be a smartphone, tablet, personal data assistant (PDA), a data processing system (DPS), a handheld device, personal computer, a server, or any other suitable electronic device, and may vary in size, shape, performance, functionality, and price.

Mobile device 100 includes at least one processor integrated circuit, processor IC 105. Included within processor IC 105 are data processor 107 and digital signal processor (DSP) 108. In some embodiments, processor IC 105 includes a baseband processor 109. In some embodiments, baseband processor 109 is an additional integrated circuit processor that is not included within processor IC 105. Processor IC 105 is coupled to system memory 110 and non-volatile storage 120 via a system interconnect 115. System interconnect 115 can be interchangeably referred to as a system bus, in one or more embodiments.

System memory 110 may be a combination of volatile and non-volatile memory, such as random access memory (RAM) and read-only memory (ROM). One or more software and/or firmware modules can be loaded into system memory 110 during operation of mobile device 100. As shown, system memory 110 can include therein a plurality of software and/or firmware modules including application (s) 112, Application-to-Data Path Preference settings module 113 (illustrated as "APP-SIM SETTINGS"), operating system (O/S) 114, basic input/output system/unified extensible firmware interface (BIOS/UEFI) 116, and other firmware (F/W) 118. The various software and/or firmware modules have varying functionality when their corresponding program code is executed by processor IC 105 or other processing devices within mobile device 100. Application(s) 112 includes a number (N) of mobile application that perform data operations, including a first mobile application 112a (illustrated as "APP1") through an $N^{th}$ mobile application 112n (illustrated as "APPN"). Examples of a data operation include video streaming, audio streaming, downloading and uploading files, and browsing websites. For simplicity, Application-to-Data Path Preference settings module 113 is simply referred to as "settings module 113."

In some embodiments, storage 120 can be a hard drive or a solid-state drive. The one or more software and/or firmware modules within storage 120 can be loaded into system memory 110 during operation of mobile device 100.

Processor IC 105 supports connection by and processing of signals from one or more connected input devices such as microphone 142, touch sensor 144, camera 145, keypad 146, and other sensors. Microphone(s) 142 detects sounds, including oral speech of a user(s), background noise, and other sounds, in the form of sound waves. In at least one embodiment, touch sensor 144 is a component of electronic display 154, enabling mobile device 100 to receive user tactile/touch input. Together, electronic display 154 and touch sensor 144 form a touchscreen electronic display that allows a user to provide input into mobile device 100 by touching features displayed on a display screen. Camera(s) 145 captures still and/or video image data, such as a video of the face of a user(s). Camera(s) 145 includes or is associated with facial recognition functionality that obtains facial recognition information and determines that the face of the user matches the face ID corresponding to a registered user. The face recognition information can indicate whether a person currently within view of camera 145 has facial features that match a previously registered face ID.

Processor IC 105 also supports connection by and processing of signals to one or more connected output devices, such as speaker 152 and electronic display 154. In at least one embodiment, mobile device 100 includes multiple electronic displays 154. Electronic display 154 can be one of a wide variety of display devices, such as a liquid crystal display (LCD) or an organic light emitting diode (OLED) display.

Additionally, in one or more embodiments, one or more device interfaces 160, such as an optical reader, a universal serial bus (USB), a card reader, Personal Computer Memory Card International Association (PCMIA) slot, and/or a high-definition multimedia interface (HDMI), can be associated with mobile device 100. Mobile device 100 also contains a power source, such as battery 162, that supplies power to mobile device 100.

Mobile device 100 further includes Bluetooth transceiver (BT) 124, accelerometer (ACCEL.) 156, global positioning system module (GPS MOD) 158, and gyroscope 157, all of which are communicatively coupled to processor IC 105. Bluetooth transceiver 124 enables mobile device 100 and/or components within mobile device 100 to communicate and/or interface with other devices, services, and components that are located external to mobile device 100. Accelerometer 156 is utilized to measure non-gravitational acceleration and enables processor IC 105 to determine velocity and other measurements associated with the quantified physical movement of a user. Gyroscope 157 communicates the angular position of mobile device 100 using gravity to help determine orientation. GPS MOD 158 enables mobile device 100 to communicate and/or interface with other devices, services, and components to send and/or receive geographic position information.

Mobile device 100 is presented as a wireless communication device. As a wireless device, mobile device 100 can communicate and/or interface with other devices, services, and components that are located external (remote) to mobile device 100, via a communication network. These devices, services, and components can interface with mobile device 100 via an external network, such as example network 170, using one or more communication protocols. That is, mobile device 100 can transmit data over network 170. Network 170 can be a local area network, wide area network, personal area network, signal communication network, and the like, and the connection to and/or between network 170 and mobile device 100 can be wired or wireless or a combination thereof. For simplicity and ease of illustration, network 170 is indicated as a single block instead of a multitude of collective components. However, it is appreciated that network 170 can comprise one or more direct connections to other devices as well as a more complex set of interconnections as can exist within a wide area network, such as the Internet. For ease of explanation, it is understood that network 170 includes multiple carrier networks, including a first carrier network 172 and a second carrier network 174. First carrier network 172 is owned/operated by a first wireless service provider/operator, and similarly, second carrier network 174 is owned/operated by a second wireless service provider/operator. A carrier network can use 3GPP™ specifications (e.g., GSM, W-CDMA, LTE, and/or 5G) or non-3GPP™ specifications and protocols for communications.

Mobile device 100 includes at least one transceiver 164, including first cellular transceiver (Cellular TRANSCVR 1) 164a and second cellular transceiver (Cellular TRANSCVR 2) 164b. Each transceiver 164 is communicatively coupled to processor IC 105 and to a respective one of antennas 166a, 166b. Antennas 166a and 166b are generally and collectively referred to as antenna 166. Each transceiver 164 allows for wide-area or local wireless communication, via a respective wireless signal 167a, 167b (generally 167), between mobile device 100 and a respective evolved node B (eNodeB) 188a, 188b (generally 188), which includes respective antenna 189a, 189b (generally 189). Mobile device 100 is capable of wide-area or local wireless communication with other mobile wireless devices or with eNodeB 188 as a part of a wireless communication network. Mobile device 100 communicates with other mobile wireless devices by utilizing a communication path involving transceiver 164, antenna 166, wireless signal 167, antenna 189, and eNodeB 188.

Mobile device 100 additionally includes wireless fidelity (WiFi) transceiver 168 that provides short-range communications with a WiFi access point 180 that provides access to the Internet via network 170. In some embodiments, mobile device 100 additionally includes a near field communication transceiver (not shown), and a wireless power transfer receiver (not shown). In one embodiment, other devices within mobile device 100 utilize antenna 166 to send and/or receive signals in the form of radio waves. For example, GPS module 158 can be communicatively coupled to antenna 166 to send/receive location data. Similarly, WiFi transceiver 168 can be communicatively coupled to antenna 166 to send/receive data.

Mobile device 100 includes at least two subscriber identification modules, which are referred to collectively as SIMs 190, and a single one of which is generally referred to as SIM 190 with a following letter of the alphabet. More particularly, SIMs 190 includes first SIM (SIM1) 190a and second SIM (SIM2) 190b. First SIM 190a may include a controller and a memory that stores a first subscriber identity. For example, the first subscriber identity can be an International Mobile Subscriber Identity (IMSI) number assigned exclusively to first SIM 190a. The first subscriber identity, as another example, may include a plurality of IMSIs, each of which is assigned exclusively to first SIM 190a. A wireless service provider that owns a carrier network (also referred to as a mobile radio communication network or core network) uses the IMSI number for identifying first SIM 190a. In at least one embodiment, the at least two SIMs 190a-190b include an e-SIM (also referred to as embedded Universal Integrated Circuit Card (eUICC)) that downloads configuration information for a wireless service provider and operates without a physically removable SIM card. In at least one embodiment, the at least two SIMs 190a-190b include an e-SIM that has machine-to-machine (M2M) and/or remote provisioning capabilities, which enable a user to switch to any service plans from any wireless service provider that offers eSIM support.

In some embodiments, mobile device 100 supports dual-SIM dual-standby (DSDS) functionality—meaning mobile device 100 allows inbound and outbound voice calls and Short Message Service (SMS) to be made and received from two subscriptions (i.e., SIM1 190a and SIM 2 190b), but only one subscription can be in a voice call at any given time. In a DSDS mobile device, a single cellular transceiver (e.g., first cellular transceiver 164a) includes a radio-frequency chain operably coupled to two SIMs (e.g., SIM1 190a and SIM 2 190b). In other embodiments, mobile device 100 supports dual-SIM dual-active (DSDA) functionality—meaning mobile device 100 allows inbound and outbound voice calls and SMS to be made and received from two subscriptions simultaneously. In a DSDA mobile device, each of two cellular transceivers (e.g., first and second cellular transceivers 164a-164b) includes a radio-frequency chain operably coupled to a respective one of two SIMs. It is understood that embodiments according to the present disclosure can be implemented in both DSDS and DSDA mobile devices, unless expressly stated as being limited to a DSDS mobile device or expressly stated as being limited to a DSDA mobile device. In some embodiments, mobile device 100 (e.g., 5G/WiFi mobile device) supports single SIM functionality and supports WiFi functionality, and the mobile device allows data paths of both the single SIM and WiFi to be active simultaneously—meaning upload and download of data operations can occur through both data paths at the same time.

Similarly, second SIM 190 may include a controller and a memory that stores a second subscriber identity. For example, second subscriber identity can be one or a plurality of IMSI numbers assigned exclusively to second SIM 190b. A wireless service provider that owns a carrier network uses the IMSI number for identifying second SIM 190b.

In a scenario involving multiple wireless service providers, first SIM 190a is associated with first carrier network 172 and first eNodeB 188a, while second SIM 190b is associated with second carrier network 174 and second eNodeB 188b. That is, first SIM 190a communicates with first carrier network 172 by transmitting data to and receiving data from first eNodeB 188a via wireless signal 167a. Second SIM 190b communicates with second carrier network 174 by transmitting data to and receiving data from second eNodeB 188b via wireless signal 167b.

In a scenario of a single wireless service provider, first SIM 190a and second SIM 190b are associated with a single carrier network (e.g., first carrier network 172 or second carrier network 174). In one example, first SIM 190a and second SIM 190b both communicate with the same carrier network (e.g., first carrier network 172) by transmitting data to and receiving data from a single eNodeB (e.g., first eNodeB 188a or second eNodeB 188b). In another example, first SIM 190a and second SIM 190b both communicate with the same carrier network by transmitting data to and receiving data from different respective eNodeBs. That is, first SIM 190a communicates with first carrier network 172 by transmitting data to and receiving data from first eNodeB 188a via wireless signal 167a. Second SIM 190b communicates with first carrier network 172 by transmitting data to and receiving data from second eNodeB 188b via wireless signal 167b.

Wireless service providers compete for customers and subscriptions by offering discounts on wireless communication services. Offerings of discounts are not limited to the scenario of multiple wireless service providers competing against each other. The single wireless provider can offer different discounts to different subscribers. For example, a single wireless service provider can offer a quota-based discount to the subscription of second SIM 190b only, and offer an application-specific discount to subscriptions of both SIMs 190a and 190b.

As an example, a first wireless service provider does not offer any discount, while a second wireless service provider may offer a quota-based discount such that data communications that are at most (i.e., ≤, less than or equal to) two (2) megabytes per billing cycle (e.g., per month) are provided at a lower charge than data communications in excess of (i.e., >, greater than) two (2) megabytes per billing cycle. The non-discounted cost of data from the first wireless service provider is higher than the discounted cost of data from the second wireless service provider, but lower than the non-discounted cost of data from the second wireless service provider. A user wanting minimized charges for wireless communication services would want to take advantage of this discount. However, without the benefit of the features of the disclosure presented herein, in order to take advantage of this discount, the user of the device would have to manually monitor her/his usage of data communications to determine whether 2 megabytes has been consumed within the billing cycle for the second wireless service provider. Additionally, the user would have to change the default SIM settings twice per month, first to the second SIM at the beginning of the billing cycle to begin consuming the discounted 2 MB of data communication and then back to the first SIM after consuming the 2 megabytes of data communications within the billing cycle.

As another example, the first wireless service provider may offer no discount, while the second wireless service provider offers a time-based discount such that data communications that occur between 9:00 p.m. and 6:00 a.m. are provided at no charge (i.e., free). A user wanting minimized charges for wireless communication services would want to take advantage of this discount. However, without the benefit of the features of the disclosure, the user would again have to manually change default SIM settings twice per day, i.e., at 9:00 pm and after 6:00 a.m. every day.

As a further example, the first and second wireless service providers may each offer different application-specific discounts. The application-specific discount of the first wireless service provider may offer data communications associated with a third mobile application 112c (e.g., a social media mobile application) at no charge. The application-specific discount of the second wireless service provider may offer data communications associated with a first mobile application 112a (e.g., a video streaming mobile application) at a lower charge than the first wireless service provider. A user wanting minimized charges for wireless communication services would want to take advantage of these discounts. However, without the benefit of the features of this disclosure, the user would again have to manually change default SIM settings every time before opening (or while executing/running) the first mobile application and every time before opening (or while executing/running) the third mobile application 112c.

As introduced above, mobile device 100 includes settings module 113, which enables processor IC 105 to perform the method 400 (FIG. 4) of user-assigning a selected one of the multiple data paths of the mobile device 100 to a selected one of the applications 112. Within mobile device 100, WiFi data path 182 includes WiFi transceiver 168. Within mobile device 100, first SIM data path 184 includes first SIM 190a, cellular transceiver 164, antenna 166, and wireless signal 167 that transmits data to and receives data from eNodeB 188 associated with first carrier network 172. Within mobile device 100, second SIM data path 186 includes second SIM 190b, cellular transceiver 164, antenna 166, and wireless signal 167 that transmits data to and receives data from an eNodeB 188 associated with second carrier network 174. Settings module 113 provides a user interface to a user of mobile device 100 that allows the user to input a selection of one mobile application (from among applications 112), and to input a selection of one data path (from among WiFi data path 182, first SIM data path 184, and second SIM data path 186) as a selected data path for assigning to the selected mobile application. Settings module 113 generates an assignment (illustrated as APP-SIM Assignment) 122 that includes an identifier 124 of a selected mobile application (APP ID) linked to an identifier (Data Path ID) 126 of a preferred data path, which is the path preferred by the user for data operations performed by the selected mobile application. It is understood that processor IC 105 executes settings module 113, which enables a user to create a setting, namely, a user-created setting in which a specified mobile application is user-assigned to a specified preferred SIM, which is one of the at least two SIMs 190a-190b. Assignment 122 is an example of a user-created setting.

Additionally, settings module 113 enables processor IC 105 to perform the method 500 (FIG. 5) of adding a data path selection rule 128 that defines criteria for selecting the preferred data path. That is, assignment 122 additionally includes at least one data path selection rule 128 that defines criteria for selecting the preferred data path instead of another data path (i.e., default SIM data path). For example, data path selection rule 128 may define time-based criteria that enables processor IC 105 to select one data path during a specified period of time and to select a different data path outside of the specified period of time. Within assignment 122, each respective data path selection rule 128 is linked to APP ID 124 and Data Path ID 126. In a no-rules scenario, assignment 122 does not include a data path selection rule 128. In response to identifying an assignment 122 without a data path selection rule 128, processor IC 105 automatically channels all data operations performed by the mobile app corresponding to APP ID 124 to the data path corresponding to Data Path ID 126 at all times. This disclosure describes data path selection rule 128 in terms of being user-created, but it is understood that in at least one embodiment of the present disclosure, settings module 113 receives (e.g., downloads) at least one data path selection rule 128 that is non-user-created (e.g., created by a wireless service provider) and applied locally to the mobile device.

Additionally, settings module 113 enables processor IC 105 to perform the method 600 (FIG. 6) of operating mobile device 100 in which a user-created setting (i.e., assignment 122) specifies a selected one of the multiple data paths (i.e., data paths 182, 184, and 186) to which a selected one of the multiple mobile applications 112 is assigned. More particularly, during operation of mobile device 100, settings module 113, enables processor IC 105 to selectively channel data operations associated with a selected mobile application (i.e., one of the applications 112) to a user-specified preferred data path.

Figure 3A:
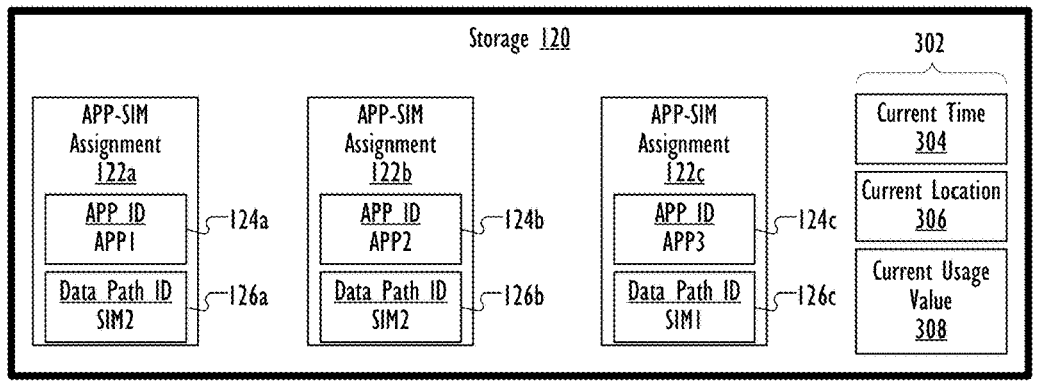
FIGS. 3A-3C illustrate three (3) examples of user-created settings that specify a selected one of the multiple data paths of the mobile device of FIG. 1 to which a selected one of the multiple mobile applications is assigned, in accordance with one or more embodiments of this disclosure.

Now referring to FIG. 3A, there is shown a no-rules scenario in which assignment 122a does not include a data path selection rule 128. In assignment 122a, second SIM data path 186 is the preferred data path user-assigned to first mobile application 112a. With assignment 122a stored in storage 120, settings module 113 enables the user of mobile device 100 to know that all cellular communications that occur in response to his/her user-interaction with first mobile application 112a will be channeled through second SIM 190b. In furtherance of this no-rules scenario, if first SIM 190a is associated with a personal account with a first wireless service provider, and if second SIM 190b is associated with a business account with a second wireless service provider, then settings module 113 enables the user of mobile device 100 to know that the business account will be charged for all cellular communications that occur in response to his/her user-interaction with first mobile application 112a. The user of mobile device 100 can use first mobile application 112a to perform data operations without the inconvenience of having to temporarily switch a default SIM setting. In at least one embodiment, first mobile application 112a is a telephone/voice-call mobile application, and second SIM 190b is user-assigned to first mobile application 112a within assignment 122a. In this telephone/voice-call embodiment, the user of mobile device 100 can use first mobile application 112a to initiate an outbound call operation without the inconvenience of having to make an on-demand selection of a SIM and without the inconvenience of having to temporarily switch a default SIM setting.

In some scenarios, a single assignment 122 includes one or multiple data path selection rules 128, as described below referring to FIGS. 3B-3C. For example, assignment 122e (described below with FIG. 3C) exhibits a single-rule scenario, in which data path selection rule 128e defines a quota-based criterion (e.g., Usage>2 megabytes (MB) per billing cycle) that enables processor IC 105 to channel data operations performed by first application 112a (identified by APP ID 124e having the value "APP1") to the preferred WiFi data path 182 (identified by Data Path ID 126e having the value "WiFi") when mobile device 100 has a current billing cycle usage value 308 (described below with FIG. 3A) that exceeds the quota criterion (2 MB). As another example, assignment 122d (described below with FIG. 3B) exhibits a multiple-rules scenario, in which data path selection rule 128d defines a first criterion 310d that is quota-based and a second criterion 312d that is time-based. In multiple-rules scenarios, Boolean operators define a relationship between the multiple criteria 310d and 312d. For example, in the case of "AND (first criterion 310, second criterion 312)", processor IC 105 selectively channels data operations performed by first application 112a to the preferred second SIM data path 186 at night (21:00≤Current Time<06:00 as defined by first criterion 310*d*) until the quota (Usage≤2 MB) is exceeded. If both first criterion 310 and second criterion 312 are not satisfied, processor IC 105 does not select the preferred second SIM data path 186 for data operations performed by first application 112*a*, but instead selects the default SIM data path.

With specific reference now to FIG. 1B, an example three-dimensional (3D) structure of dual-SIM mobile device 100 is presented. It is understood that components of mobile device 100 (FIG. 1) are included within dual-SIM mobile device 100 (FIG. 1B). The front of the body of mobile device 100 includes first electronic display 154. In at least one embodiment, mobile device 100 includes multiple electronic displays. For example, the back of the body of mobile device 100 can include a second electronic display 154.

Electronic display 154 presents a graphical user interface (GUI) that displays multiple application icons 130*a*-130*e* corresponding to respective mobile applications 112*a*-112*e*. In at least one embodiment, first mobile application 112*a* is a video streaming mobile application (e.g., YouTube® application), a second mobile application 112*b* is a cloud-based file storage mobile application (e.g., Dropbox® application), third mobile application 112*c* is a social media mobile application, fourth mobile application 112*d* is a web browser mobile application, and fifth mobile application 112*e* is a multimedia streaming mobile application. In response to detecting touch input on one of the icons 130*a*-130*e*, processor IC 105 (using touch sensor 144) receives a selection of a specific one of mobile applications 112*a*-112*e* to run.

Electronic display 154 displays multiple status bars, including first status bar 132 and second status bar 134. First status bar 132 represents the strength of a cellular signal associated with first SIM 190*a*, and second status bar 134 represents the strength of a cellular signal associated with second SIM 190*b*.

FIGS. 2A-2E illustrate example Application-to-Data Path settings menus for user-assigning a selected one of the multiple data paths of the mobile device of FIG. 1 (FIGS. 1A and 1B) as a preferred data path for a selected one of the multiple mobile applications, in accordance with one or more embodiments of this disclosure. Electronic display 154 separately displays each of the Application-to-Data Path settings menus (FIGS. 2A-2E) as part of a GUI.

With specific reference now to FIG. 2A, there is illustrated a first Application-to-Data Path settings menu 200 for managing cellular communications and subscriptions associated with each of the multiple SIMs (i.e., SIM1 190*a* and SIM2 190*b*). For simplicity, first Application-to-Data Path settings menu 200 will be referred to as simply first settings menu 200. First settings menu 200 includes a first menu item 202 for user-assigning at least one of the multiple data paths 182, 184, 186 to a selected one of the multiple mobile applications 112*a*-112*e*. Settings module 113 generates an assignment 122 based on input that selects first menu item 202. In at least one embodiment, each new assignment 122 is initially generated with a null value as APP ID 124 and a null value as Data Path ID 126, and later the assignment 122 is updated with identifiers of the selected mobile application and preferred data path. In at least one other embodiment, an identifier of the selected mobile application as APP ID 124 and an identifier of the preferred data path as Data Path ID 126 are obtained) and then used for initial generation of the new assignment 122. As an example, the identifier (APP ID 124) of the selected mobile application is obtained from user selection of the selected mobile application using second settings menu 210. The identifier (Data Path ID 126) of the preferred data path is obtained from user selection of the preferred data path using third or fourth settings menu 220 or 230.

First settings menu 200 includes a second menu item 204 for showing a default SIM setting to a user, for example, showing which of the multiple SIMs 190*a*-190*b* has been set as the default SIM. Processor IC 105 automatically determines whether a selected mobile application is user-assigned to (e.g., associated with) a preferred data path. More particularly, processor IC 105 automatically searches the assignments 122*a*-122*n* (FIGS. 1 and 3A-3C) for an APP ID 124 that matches the APP ID of the currently selected mobile application. If the selected mobile application is not user-assigned to a preferred data path, then mobile device 100 automatically channels all data operations through the default SIM. When the selected mobile application is user-assigned to a preferred data path, then mobile device 100 automatically channels data operations to the user-preferred data path, based on data path selection rules 128 (if any) within the matching assignment 122.

Refer now to FIG. 2B. In response to receiving an input selecting first menu item 202, electronic display 154 displays second Application-to-Data Path settings menu 210 for selecting one of the applications 112*a*-112*e* as a selected mobile application, which is selected for initiated an assignment to the mobile application. For simplicity, second Application-to-Data Path settings menu 210 will be referred to as simply second settings menu 210. Second settings menu 410 includes APP1 menu item 212 for receiving a selection of APP1 112*a* as the selected mobile application. Similarly, second settings menu 410 includes APP2, APP5, APP4, and APP5 menu items 214, 216, 218, and 219 for receiving a selection of the respective second, third, fourth, or fifth application 112*b*, 112*c*, 112*d*, or 112*e* as the selected mobile application. If APP1 menu item 212 is selected, settings module 113 updates an APP ID 124 corresponding to the generated assignment 122, by adding the identification of APP1 112*a* to the generated assignment 122. If APP2 menu item 214 is selected, settings module 113 updates an APP ID 124 corresponding to the generated assignment 122, by adding the identification of APP2 112*b* to the generated assignment 122.

Refer now to FIG. 2C. In response to receiving input selecting APP1 menu item 212, electronic display 154 displays a third Application-to-Data Path settings menu 220 for selecting one of the multiple data paths 182, 184, 186 for user-assigning to APP1 112*a*, the selected mobile application. For simplicity, third Application-to-Data Path settings menu 220 will be referred to as third settings menu 220.

Figure 2F:
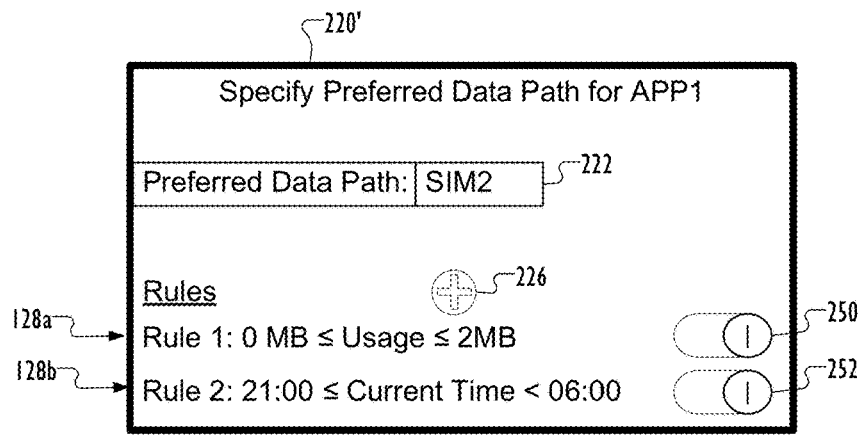
FIG. 2F illustrates an example Application-to-Data Path Preference settings menu for enabling or disabling a data path selection rule, in accordance with one or more embodiments of this disclosure.

Third settings menu 220 includes third menu item 222 (illustrated as Preferred Data Path) for receiving a selection to display a list (e.g., drop-down menu) of data paths available for selection. In response to receiving input selecting third menu item 222, electronic display 154 displays a drop-down menu that includes SIM1 menu item 223, SIM2 menu item 224, and WiFi menu item 225. The drop-down menu is a list of data paths available for selection as the preferred data path for the selected mobile application, namely, first application 112*a*. That is, each of the menu items 223-225 corresponds to a selection of WiFi data path 182, SIM1 data path 184, or SIM2 data path 186, respectively. In at least one embodiment, electronic display 154 displays the Data Path ID of the preferred data path next to third menu item 222. For example, processor IC 105 indicates that second SIM data path 186 is the preferred data path for first application 112*a* by displaying "SIM2" next to third menu item 222, as shown in FIG. 2F. Note that third menu item 222 displays "Preferred Data Path" (as shown in FIG. 2C) in case no preferred data path is yet selected. Third menu item 222 displays the name of the preferred data path ("SIM2" as shown in FIG. 2F) in case a preferred data path is already selected. In response to receiving input selecting third menu item 222, electronic display 154 displays a list of data paths available for selection as the preferred data path for the selected mobile application, regardless of whether no preferred data path is yet selected or a preferred data path is already selected. Third settings menu 220 includes Add Rule menu item 226 (illustrated as a plus sign button) for receiving a selection to create a new data path selection rule 128. In at least one embodiment, Add Rule menu item 226 may be unavailable (e.g., visually grayed out) unless settings module 113 has received the selection of the preferred data path for the selected mobile application.

Now referring to FIG. 2D, there is illustrated a fourth Application-to-Data Path settings menu 230 that is the same as third Application-to-Data Path settings menu 220 of FIG. 2C, except second application 112b is the selected mobile application in FIG. 2D, and first application 112a is the selected mobile application in FIG. 2C. In response to receiving input selecting APP2 menu item 214 (FIG. 2B), electronic display 154 displays a fourth Application-to-Data Path settings menu 230 for selecting one of the multiple data paths 182, 184, 186 for user-assigning to APP2 112b, the selected mobile application. For simplicity, fourth Application-to-Data Path settings menu 230 will be referred to as fourth settings menu 230. It is understood that menu items 232, 233, 234, 235, and 236 shown in FIG. 2D are the same as or similar to respective menu items 222, 223, 224, 225, and 226 shown in FIG. 2C.

Refer now to FIG. 2E. In response to receiving input selecting Add Rule menu item 226 (FIG. 2C) or Add Rule menu item 236 (FIG. 2D), electronic display 154 displays a fifth Application-to-Data Path settings menu 240 for defining at least one criterion for selecting the preferred data path for data operations performed by the selected mobile application. For simplicity, fifth Application-to-Data Path settings menu 240 will be referred to as fifth settings menu 240.

Fifth settings menu 240 includes quota-based criterion menu item 242 (illustrated as a plus sign button) for receiving a selection to define quota-based selection criteria 243. Quota-based selection criteria 243 defines a range of digital storage per billing cycle. When mobile device 100 has a current billing cycle usage value 308 (described below with FIG. 3A) that is within the range of digital storage defined as quota-based selection criteria 243, selected mobile application performs data operations via the preferred data path. As an example, quota-based selection criteria 243 defines a maximum usage of 2 MB (i.e., 0 MB≤Usage≤2 MB) as the range of digital storage per billing cycle.

Fifth settings menu 240 includes time-based criterion menu item 244 (illustrated as a plus sign button) for receiving a selection to define (e.g., add) time-based selection criteria 245. Time-based selection criteria 245 defines a period of time, such as a period of time per day/week/month/year. When the current local time of mobile device 100 is within the period of time defined as time-based selection criteria 245, the selected mobile application performs data operations via the preferred data path. As an example, time-based selection criteria 245 defines a night time period that begins at 9:00 pm and ends before 6:00 a.m. (i.e., (21:00≤Current Time<06:00) as the range of time. Other examples of a time-based selection criteria may define a weekend period of time that begins Saturday and ends before Monday, or may define a monthly period of time that begins on the third Saturday of the month and ends on the $28^{th}$ day of the month, or may define a yearly period of time that is the user's birthday.

Fifth settings menu 240 includes geographical location-based criterion menu item 246 (illustrated as a plus sign button, labeled "Geo-based") for receiving a selection to define location-based selection criteria 247. Location-based selection criteria 247 defines a geographical area. When the geographical location (e.g., latitude/longitude coordinates, or GPS coordinates) of mobile device 100 is a subset within the geographical area defined as location-based selection criteria 247 (Current Location⊆Geo-Area), the selected mobile application performs data operations via the preferred data path. As an example, location-based selection criteria 247 can define a radius around a pin-point location as the geographical area. For example, a radius around a pin-point location can be defined as less than 10 meters away from latitude/longitude coordinates of the front door of user's home. As another example, location-based selection criteria 247 defines a set of GPS coordinates (e.g., latitude/longitude coordinates within a rectangular area bounded by four specified streets) as the geographical area.

Referring now to FIG. 2F, which illustrates Application-to-Data Path Preference settings menu 220' for enabling or disabling a data path selection rule, in accordance with one or more embodiments of this disclosure. As an example, Application-to-Data Path Preference settings menu 220' represents third settings menu 220 (FIG. 2C) after second SIM data path 186 is user-selected as preferred data path and is user-assigned to first application 112a, and after adding a first data path selection rule 128a that defines quota-based selection criteria 243, and after adding a second data path selection rule 128b that defines time-based selection criteria 245. Third menu items 222 and Add Rule menu item 226 shown in FIG. 2F perform the same functions as described above with FIG. 2C.

For each data path selection rule 128, Application-to-Data Path Preference settings menu 220' includes an enable/disable button 250, 252 (e.g., ON/OFF button) enabling a user to temporarily enable or disable a specific data path selection rule 128 without having to delete and re-create the rule each time the user desires to enable the rule 128. As shown in FIG. 2F, both enable/disable buttons 250 and 252 are in the enable position, indicating that processor IC 105 will enforce first and second data path selection rules 128a and 128b.

Figure 3B:
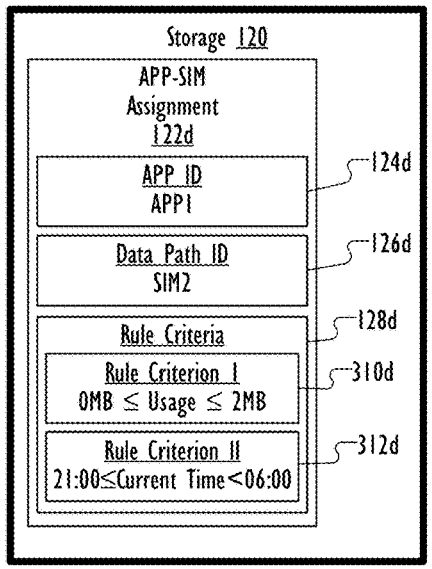
Figure 3C:
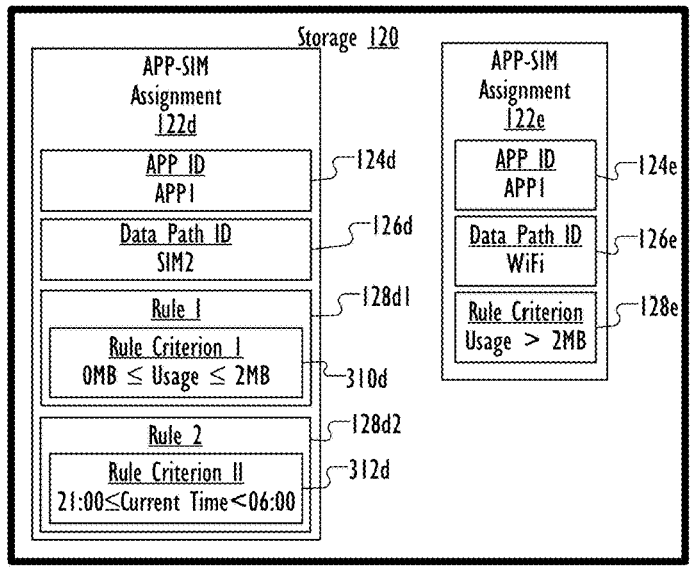

Referring now to FIGS. 3A-3C, which illustrate three (3) examples of user-created settings that specify a selected one of the multiple data paths of the mobile device of FIGS. 1A and 1B to which a selected one of the multiple mobile applications is assigned, in accordance with one or more embodiments of this disclosure.

Referring specifically now to FIG. 3A. In the example scenario, storage 120 stores a number (e.g., N=3) of assignments 122a, 122b, and 122c, each including a respective APP ID 124a, 124b, 124c linked to a corresponding Data Path ID 126a, 126b, 126c. None of assignments 122a, 122b, and 122c include a data path selection rule 128. Within first assignment 122a, second SIM data path 186 is the preferred data path that is user-assigned to first application 112a. Within first assignment 122a, "APP1" is the APP ID 124a linked to "SIM2," which is the Data Path ID 126a of the preferred data path. Within second assignment 122b, second SIM data path 186 is the preferred data path that is user-assigned to second application 112b. Within second assignment 122b, "APP2" is the APP ID 124b linked to "SIM2," which is the Data Path ID 126b of the preferred data path.

Within third assignment 122c, first SIM data path 184 is the preferred data path that is user-assigned to third application 112c. Within third assignment 122c, "APP5" is the APP ID 124c linked to "SIM1," which is the Data Path ID 126c of the preferred data path. As shown in FIG. 3A, a single data path (e.g., second SIM data path 186) can be the preferred data path that is user-assigned to multiple mobile applications 112a-112b.

In FIG. 3A, storage 120 stores contextual information 302, including current time 304, current location 306, and current billing cycle usage value 308. Processor 105 can obtain current time 304 of mobile device 100 from GPS MOD 158 and/or from a carrier network 172, 174, and compare current time 304 to a period of time defined as a time-based criterion (e.g., criterion 245 of FIG. 2E). Processor 105 can obtain a current location 306 of mobile device 100 from GPS MOD 158, and compare the current location 306 to a geographical area defined as a location-based criterion (e.g., criterion 247 of FIG. 2E). Processor 105 can obtain a current billing cycle usage value 308 of mobile device 100 from cellular transceiver 164, which can count an amount of digital data (measured in either bits or bytes) that is transmitted and received through cellular transceiver 164. Processor 105 can compare the current billing cycle usage value 308 to a quota range defined as a quota-based criterion (e.g., criterion 243 of FIG. 2E).

Referring now to FIG. 3B. In the example scenario, storage 120 stores a number (e.g., N=1) of assignments, including fourth assignment 122d. Fourth assignment 122d is similar to first assignment 122a, in the manner that in both assignments, second SIM data path 186 is the preferred data path that is user-assigned to first application 112a. All components 124a and 126a of first assignment 122a are the same as corresponding components of fourth assignment 122d.

Additionally, fourth assignment 122d includes at least one data path selection rule. In one embodiment shown in FIG. 3B, fourth assignment 122d includes a single data path selection rule 128d, which includes first and second rule criteria 310d and 312d. In another embodiment shown in FIG. 3B, fourth assignment 122d includes or is divided into multiple data path selection rules, including a first data path selection rule 128d1 that is defined by first rule criterion 310d, and a second data path selection rule 128d2 that is defined by second rule criterion 312d.

Referring now to FIG. 3C. In the example scenario, storage 120 stores a number (e.g., N=2) of assignments, including fourth assignment 122d and fifth assignment 122e. Within fifth assignment 122e, WiFi data path 182 is the preferred data path that is user-assigned to first application 112a. In fifth assignment 122e, "APP1" is the APP ID 124e linked to "WiFi," which is the Data Path ID 126e of the preferred data path. Additionally, fifth assignment 122e includes one data path selection rule 128e, which defines a single quota-based criterion (Usage>2 MB).

As shown in FIG. 3C, a user can create multiple assignments 122d and 122e to user-assign multiple data paths (e.g., second SIM data path 186 and WiFi data path 182) as the respective preferred data paths of a single mobile application (e.g., first mobile application 112a). When a processor IC 105 runs first application 112a (APP1), settings module 113 channels data operations (associated with APP1) to second SIM data path 186 until mobile device 100 has a current billing cycle usage value 308 that exceeds the first rule quota criterion 310d (Usage≤2 MB). If the first rule quota criterion 310d is exceeded, then mobile device 100 has a current billing cycle usage value 308 that satisfies the quota-based criterion 128e of rule 128e. That is, settings module 113 channels data operations associated with first application 112a to WiFi data path 182 in response to a determination that current billing cycle usage value 308 is greater than 2 MB.

Figure 4:
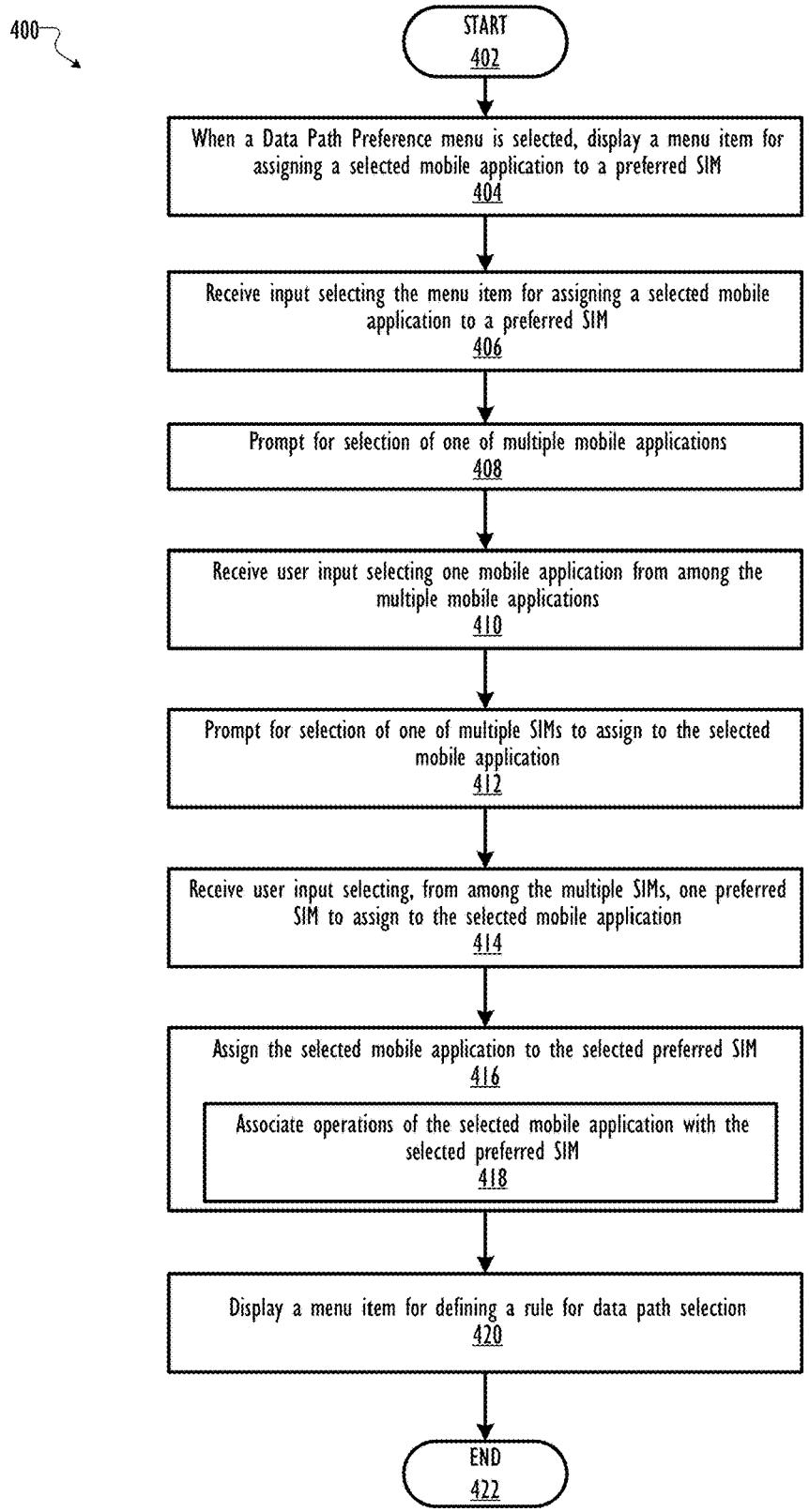
FIG. 4 is a flow chart illustrating a method for user-assigning a selected one of the multiple data paths of the mobile device of FIG. 1 to a selected mobile application, in accordance with one or more embodiments of this disclosure.
Figure 5:
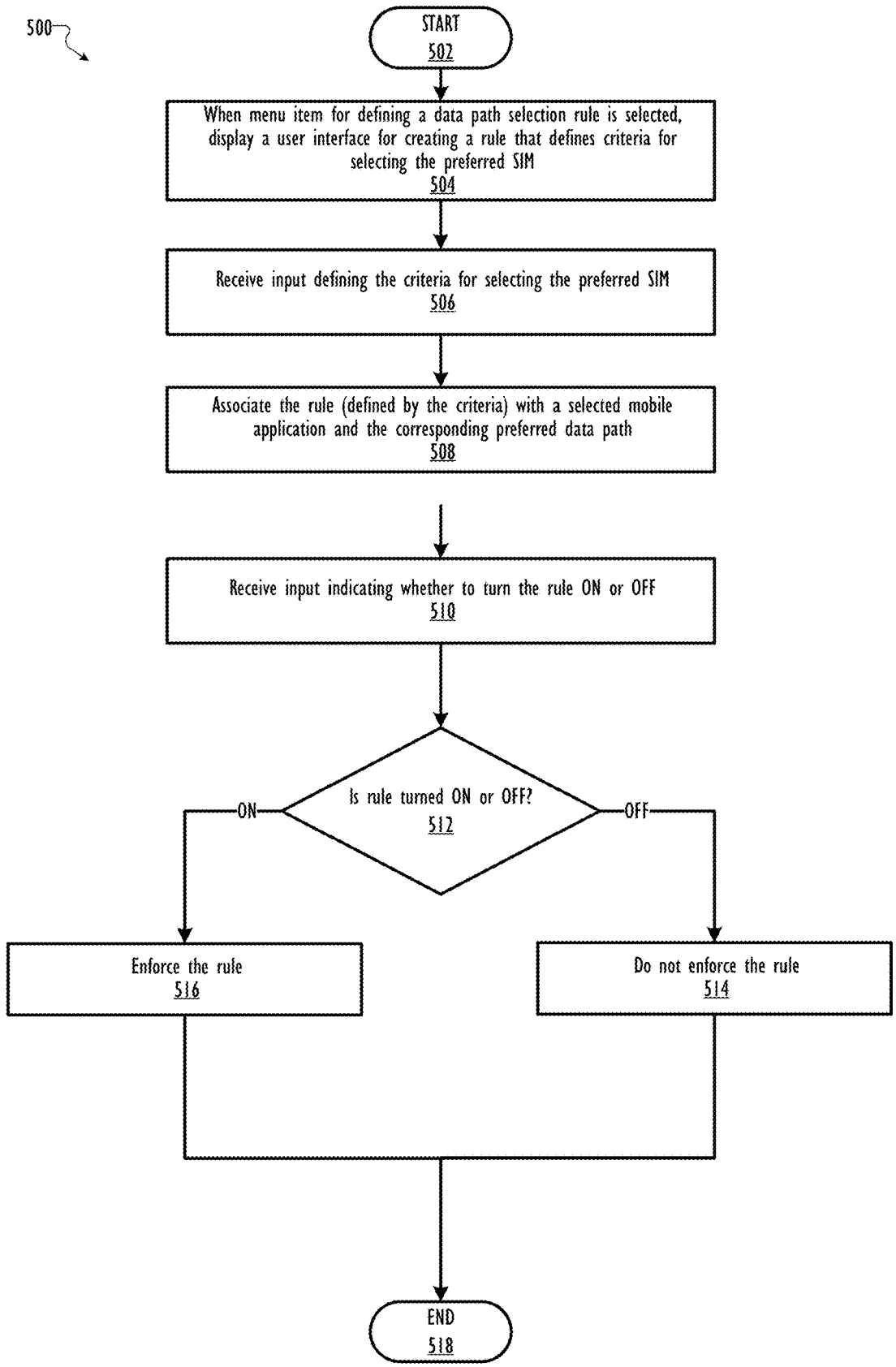
FIG. 5 is a flow chart illustrating a method for adding a data path selection rule that defines criteria for selecting the preferred data path, in accordance with one or more embodiments of this disclosure.
Figure 6:
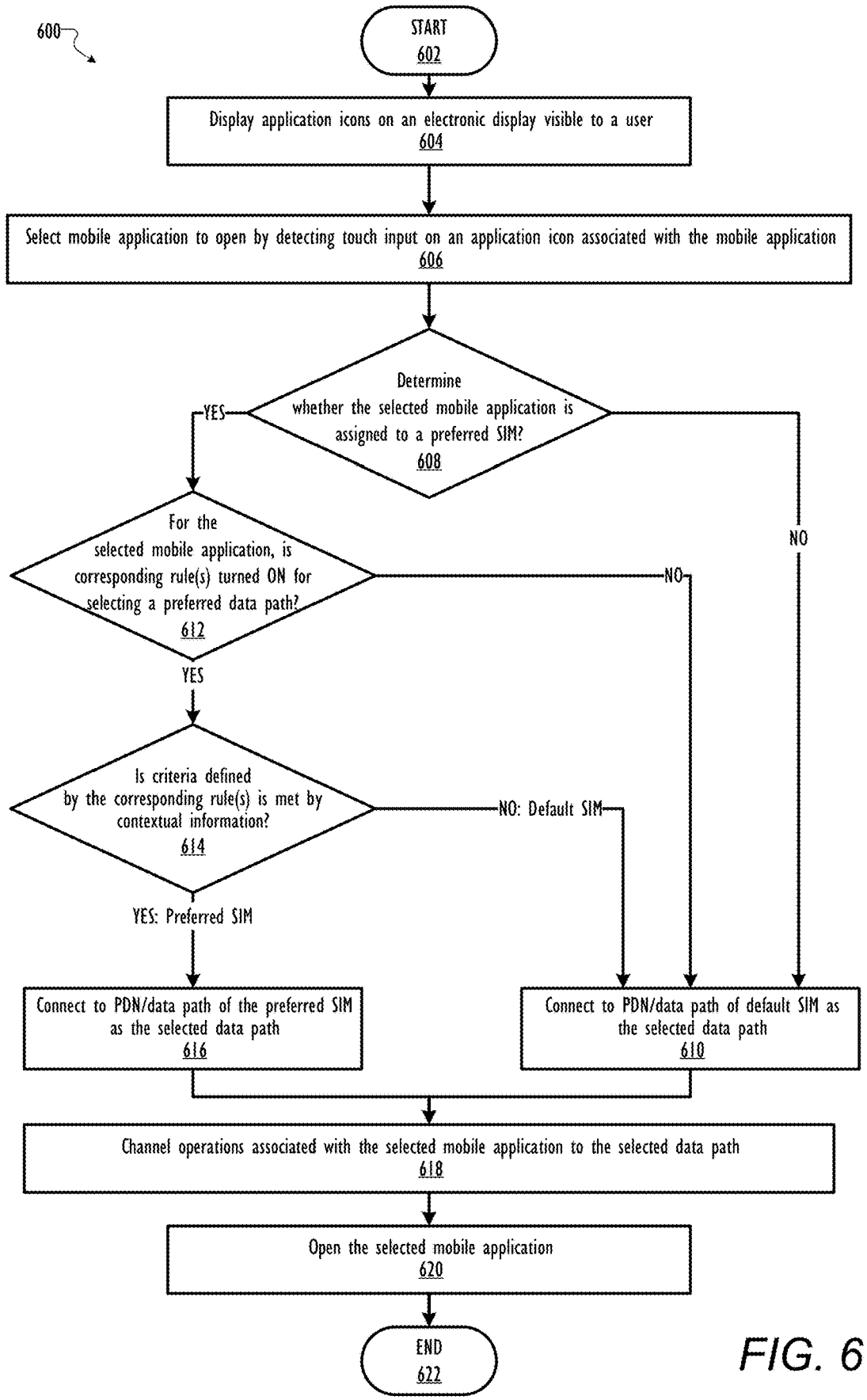
FIG. 6 is a flow chart illustrating a method for operating a multi-SIM mobile device in which a user-created setting specifies a selected one of the multiple data paths to which a mobile application is assigned, in accordance with one or more embodiments of this disclosure.

Referring now to the flow charts, FIG. 4 is a flow chart illustrating a method 400 for user-assigning a selected one of the multiple data paths of the mobile device of FIGS. 1A-1B to a selected one of the multiple mobile applications, in accordance with one or more embodiments of this disclosure. FIG. 5 is a flow chart illustrating a method for adding a data path selection rule that defines criteria for selecting the preferred data path, in accordance with one or more embodiments of this disclosure. FIG. 6, is a flow chart illustrating a method for operating a multi-SIM mobile device in which a user-created setting specifies a selected one of the multiple data paths to which a selected one of the multiple mobile applications is assigned, in accordance with one or more embodiments of this disclosure. The description of methods 400, 500, and 600 will be described with reference to the components and examples of FIGS. 1A-3C. The functions presented within methods 400, 500, and 600 are achieved by processor execution of Application-to-Data Path Preference settings module 113 within mobile device 100 (FIGS. 1A-1B), in accordance with one or more embodiments.

The operations illustrated in FIGS. 4-6 can be performed by mobile device 100 (FIGS. 1A-1B) or any suitable device, including one or more functional components of mobile device 100 that provide the described features. One or more of the processes of the methods described in FIGS. 4-6 are generally described as being performed by a processor (e.g., processor IC 105) executing program code associated with Application-to-Data Path Preference settings module 113, which execution involves the use of other components of mobile device 100.

Now referring to FIG. 4, method 400 begins at start block 402, then proceeds to block 404. At block 404, processor 105 displays menu item 202 for assigning a selected mobile application to a preferred data path. More particularly, as shown in FIG. 2A, first settings menu 200a is an example of a data path preference menu, which when selected, enables processor 105 to display first menu item 202. In one embodiment, the preferred data path is selected from among the multiple data paths 182, 184, 186 of mobile device 100. In another embodiment, the preferred data path is selected from among at least two SIM data paths 184 and 186 associated with at least two SIMs 190a-190b. In the description of FIGS. 4-6, the term "SIM" is used to describe any of the multiple data paths 182, 184, 186 of mobile device 100, and this phrase does not limit this disclosure to only SIM data paths. Similarly, in the description of FIGS. 4-6, the phrase "preferred SIM" is used to describe a preferred data path selected from among the multiple data paths 182, 184, 186 of mobile device 100, and this phrase does not limit this disclosure to only preferences of SIM data paths. At block 406, processor 105 receives input selecting the menu item 202 for assigning a selected mobile application to a preferred SIM.

At block 408, processor 105 prompts for selection of one of multiple mobile applications 112. For example, as shown in FIG. 2B, processor 105 displays second settings menu 210, which prompts a user to provide a touch input on one of the APP1-APP5 menu items 212, 214, 216, and 218-219. At block 410, processor 105 receives a selection of one mobile application from among the multiple applications 112. More particularly, processor 105 receives user input (e.g., touch input detected by touch sensor 144) on one of the APP1-APP5 menu items 212, 214, 216, and 218-219 for selecting one mobile application from among the multiple mobile applications 112. In an example scenario of creating fourth assignment 122d (FIG. 3B), processor 105 receives a touch input on APP1 menu item 212 (FIG. 2B).

At block 412, processor 105 prompts for selection of one of multiple SIMs to assign to the selected mobile application. For example, as shown in FIG. 2C, processor 105 displays third settings menu 220, which prompts a user to provide a touch input on one of menu items 223-225 that correspond to a selection of WiFi data path 182, first SIM data path 184, and second SIM data path 186, respectively, which are each available for selection as the preferred data path for the selected mobile application (e.g., 112a). At block 414, processor 105 receives a selection of one preferred SIM (i.e., SIM or WIFI data path) to assign to the selected mobile application. In an example of scenario creating fourth assignment 122d (FIG. 3B), processor 105 receives a touch input on SIM2 menu item 224 (FIG. 2C) that correspond to a selection of second SIM data path 186.

At block 416, processor 105 assigns the selected mobile application to the selected preferred SIM. More particularly, processor 105 user-assigns the preferred SIM to the selected mobile application by generating an assignment 122 that includes an identifier 124 of a selected mobile application (APP ID) linked to an identifier (Data Path ID) 126 of a preferred data path. In at least one embodiment, by user-assigning the preferred SIM to the selected mobile application, processor 105 associates (at block 418) operations (e.g., I/O functions and/or data operations and/or cellular communication) performed by the selected mobile application with the preferred SIM. For example, first assignment 122a (FIG. 3A) shows that data operations performed by first application 112a (identified by "APP1" as APP ID 124a) are associated with second SIM 190b (identified by "SIM2" as Data Path ID 126a) as the preferred SIM.

At block 420, processor 105 displays a menu item 226 for adding and defining a data path selection rule 128. In an example scenario of creating fourth assignment 122d (FIG. 3B), in response to identifying that second SIM data path 186 has been user-selected as the preferred data path, processor 105 displays Add Rule menu item 226 as being available for selection, as shown in FIGS. 2C and 2F. By displaying Add Rule menu item 226, processor 105 enables a user to provide user input indicating a selection to create a rule that defines criteria for selecting the preferred SIM. The method 400 concludes at the end block 422.

Now referring to FIG. 5, method 500 begins at the start block 502, then proceeds to block 504. In at least one embodiment, start block 502 of FIG. 5 is the same as block 420 of FIG. 4. At block 504, processor 105 displays a user interface for creating a rule 128 that defines criteria for selecting the preferred SIM. More particularly, as shown in FIG. 2C, Add Rule menu item 226 is an example of a menu item for defining a data path selection rule, which when selected, enables processor 105 to display fifth settings menu 240 (FIG. 2F). Fifth settings menu 240 is an example user interface for creating a data path selection rule 128 that defines criteria 243, 245, 247 for selecting the preferred SIM.

At block 506, processor 105 receives input defining the criteria for selecting the preferred SIM. In an example of scenario creating fourth assignment 122d (FIG. 3B), processor 105 receives a touch input on quota-based criterion menu item 242, and then receives user input (e.g., text input and/or voice input translated into text) defining quota-based selection criteria 243 as a range of digital storage per billing cycle. The range of quota-based selection criteria 243 is defined by a minimum usage of 0 MB and a maximum usage of 2 MB (i.e., 0 MB≤Usage≤2 MB). At block 508, processor 105 associates the rule 128 with the corresponding selected mobile application and the corresponding preferred data path. For example, within fourth assignment 122d (FIGS. 3B-3C), each respective data path selection rule 128d and 128d1-128d2 is linked to the APP ID 124d and Data Path ID 126d. In at least one embodiment, multiple data path selection rules 128 are created. In such embodiments, method 500 repeats the functions of block 506 and 508 for creating each of the multiple data path selection rules.

At block 510, processor 105 receives input indicating whether to turn the rule ON or OFF. For example, processor 105 displays settings menu 220' (FIG. 2F) for receiving input of a selection of the enable position or the disable position for one of enable/disable buttons 250 and 252 (e.g., ON/OFF button), which enables temporary enablement or disablement of a specific data path selection rule 128. It is understood that the input received at block 510 can indicate a selection of the enable position or the disable position for multiple data path selection rules 128. At decision block 512, processor 105 determines whether a data path selection rule 128 is turned ON or OFF. In response to a determination that the data path selection rule 128 is turned OFF, processor 105 does not enforce (at block 514) the rule data path selection rule 128. In response to a determination that the data path selection rule 128 is turned ON, processor 105 enforces (at block 516) the rule data path selection rule 128. The method 500 concludes at the end block 518.

Now referring to FIG. 6, method 600 begins at the start block 602, and then proceeds to block 604. At block 604, processor 105 displays application icons 130a-130e on an electronic display 154 visible to a user.

At block 606, processor 105 selects a mobile application to open/launch/run by detecting a touch input on an application icon associated with the mobile application. For example, processor 105 selects first mobile application 112a by detecting (using touch sensor 144) touch input on first application icon 130a, and in response, executes program code associated with first application icon 130a.

At decision block 608, processor 105 determines whether the selected mobile application is assigned to a preferred SIM. More particularly, processor 105 searches storage 120 to identify a user-created setting (i.e., assignment 122) that specifies an APP ID 124 that matches the APP ID of the selected mobile application. For example, if first mobile application 112a is the selected mobile application, then processor 105 may search storage 120 to identify an assignment 122 that specifies an APP ID (e.g. APP ID 124a) that matches "APP 1", which identifies the selected mobile application (112a). In at least one embodiment, processor 105 makes this determination by identifying a user-created setting (e.g., assignment 122) that specifies one of the at least two SIMs as a preferred SIM to which the selected mobile application is assigned. In response to a determination that the selected mobile application (e.g., first mobile application 112a) is not assigned to a preferred SIM, processor 105 selects (at block 610) the data path (e.g., packet data network (PDN)) of the default SIM as the selected data path for operations associated with the selected mobile application. In response to a determination that the selected mobile application (e.g., first mobile application 112a) is user-assigned to a preferred SIM, the method 600 proceeds to decision block 612.

At decision block 612, for the selected mobile application, processor 105 determines whether a corresponding data path selection rule(s) 128 is turned ON for selecting a preferred data path. In the example shown in FIG. 2F, processor 105 determines whether each of first and second data path selection rules 128a-128b is turned ON based on whether a respective enable/disable button 250 and 252 is in the enable position. In response to a determination that no data path selection rule(s) 128 is turned ON (i.e., enable/disable buttons 250 and 252 are in the disable position) for the selected mobile application (e.g., SIM2 112b), processor 105 selects (at block 610) the data path of the default SIM as the selected data path for operations associated with the selected mobile application. In response to a determination that at least one data path selection rule(s) 128 is turned ON (i.e., enable/disable button 250 and 252 are in the disable position) for the selected mobile application (e.g., SIM2 112b), the method 600 proceeds to block 614.

At decision block 614, for the selected mobile application, processor 105 determines whether selection criteria (e.g., criteria 310d and 312d of FIG. 3B), which is defined by the data path selection rules 128a-128b that are turned ON and that are linked to the selected mobile application (112b), are met by contextual information 302 of the mobile device 100. More particularly, processor 105 makes this determination by obtaining contextual information 302 (FIG. 3A) such as current time, current location, or current billing cycle usage value. Further, processor 105 makes this determination by determining that contextual information 302 is within time/location/quota ranges that the selection criteria (310d and 312d) define. In response to a determination that contextual information 302 of the mobile device 100 satisfies the selection criteria (310d and 312d), processor 105 selects (at block 616) the data path of the preferred SIM as the selected data path for operations associated with the selected mobile application. In response to a determination that contextual information of the mobile device 100 does not satisfy the selection criteria (310d and 312d), processor 105 selects (at block 610) the data path of the default SIM as the selected data path for operations associated with the selected mobile application.

In at least one embodiment, at block 610, processor 105 connects to the selected data path, which is the data path of the default SIM. At block 616, processor 105 connects to the selected data path, which is the preferred data path. In both block 610 and 616, if processor 105 has already established an active connection to the selected data path, then processor 105 simply maintains the active connection. In both block 610 and 616, if processor 105 does not have an active connection to the selected data path, then processor 105 establishes an active connection to the selected data path. In embodiments in which mobile device 100 is a DSDS mobile device, if processor 105 does not have an active connection to the selected data path, then processor 105 switches to the selected data path.

In at least one embodiment, processor 105 can launch (e.g., open and run) multiple mobile applications 112 at the same time. That is, in some scenarios, processor 105 launches two different mobile applications that have conflicting data path selections. For example, processor 105 may launch first and third mobile applications 112a and 112c, which are associated with user-created settings (i.e., assignments 122a and 122c of FIG. 3A) that have conflicting data path selections ("SIM2" (126a) and "SIM1" (126c)). This type of conflict can be resolved in multiple ways.

In at least one embodiment of a DSDA mobile device, for each of the concurrently-executed mobile applications, processor 105 resolves this apparent conflict by selecting the "selected data path" based on the user-created settings of that mobile application. That is, processor 105 channels data operations associated with first mobile application 112a based on corresponding user-created settings (i.e., assignment 122a), and channels data operations associated with third mobile application 112c based on corresponding user-created settings (i.e., assignments 122c). This type of conflict resolution is possible in a mobile device (e.g., DSDA or 5G/WiFi) with capabilities to allow data operations on multiple data paths simultaneously.

In at least one embodiment of a DSDS mobile device, processor 105 resolves this apparent conflict by determining which one of the concurrently-executed mobile applications 112a or 112c is active in the foreground (referred to as "foreground application"), and determining that the remaining concurrently-executed mobile application(s) is executed in the background (referred to as "background application(s)"). Processor 105 selects the "selected data path" based on the user-created settings of the foreground application. That is, processor 105 channels data operations associated with both concurrently-executed mobile applications to the same selected data path.

In at least one embodiment of a mobile device with WiFi and single/dual SIM, the mobile device resolves this apparent conflict by applying conflict-resolution rules. The conflict-resolution rules define whether processor 105 selects the "selected data path" to be the WiFi data path or the SIM data path. An example conflict-resolution rule can cause processor 105 to resolve this type of conflict by selecting the WiFi data path for both concurrently-executed mobile applications.

It should be noted that in method 600, the preferred data path is not always selected. Also, in some scenarios, a single data path can be all three of the preferred data paths, the data path of the default SIM, and the selected data path. For example, a mobile device can automatically assign second SIM 190b as the default SIM, and a user can create fourth assignment 122d (FIGS. 3B-3C) in which second SIM data path 186 is user-assigned to first mobile application 112a. In this example, at block 614 of method 600, during nights (21:00≤Current Time<06:00 as defined by first criterion 310d), processor IC 105 would select the data path (186) of the preferred SIM as the selected data path for operations associated with the selected mobile application. In this example, at block 614 of method 600, during daytime (21:00>Current Time≥06:00), processor IC 105 would select the data path (186) of the default SIM as the selected data path for operations associated with the selected mobile application. In all scenarios, the selected data path is one selected from among the preferred data path and the data path of default SIM.

At block 618, processor 105 channels data and operations associated with the selected mobile application to the selected data path. In some embodiments, processor 105 associates the selected data path to the selected mobile application prior to any data operations being performed by the selected mobile application. Additionally, in some embodiments, prior to opening a selected mobile application, processor 105 associates the selected data path to the selected mobile application. At block 620, processor 105 opens and runs the selected mobile application. The method 600 concludes at the end block 622.

In the above-described flowcharts of FIGS. 4-6, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A wireless communication device comprising:
at least two subscriber identification modules (SIMs), including a first SIM and a second SIM;
a memory storing multiple mobile applications for performing data operations, with at least two mobile applications among the multiple mobile applications assigned, based on a respective user-created setting for a corresponding one of the at least two mobile applications, to a user-selected one of the at least two SIMs for channeling respective data operations, wherein a first user-created setting for a first mobile application assigns data operations of the first mobile application for completion via a first data path comprising the first SIM, while a second user-created setting for a second mobile application assigns data operations of the second mobile application for completion via a second data path comprising the second SIM; and
a processor coupled to each of the at least two SIMs, and the memory, and which executes program code that enables the wireless communication device to:
select at least one mobile application to run from among the at least two mobile applications;
identify, for each of the at least one mobile application, a user-created setting that specifies one of the at least two SIMs as a preferred SIM to which the selected at least one mobile application is assigned; and
channel data operations associated with each of the at least one selected mobile application to a corresponding data path of the preferred SIM specified in the user-created setting for the corresponding at least one selected mobile application.

2. The wireless communication device of claim 1, wherein the program code further enables the device to:
create, for each selected mobile application, the setting specifying one of the at least two SIMs as the preferred SIM to which to assign the selected mobile application by:
displaying, on at least one electronic display of the wireless communication device, a menu item for assigning a selected mobile application to a preferred SIM from among the at least two SIMs; and
receiving a selection of one mobile application from among the multiple mobile applications;
receiving a selection of one preferred SIM to assign to the selected mobile application; and
assigning the selected mobile application to the selected preferred SIM.

3. The wireless communication device of claim 1, wherein the program code further enables the device to:
identify a data path selection rule that defines criteria for selecting the data path of the preferred SIM;
determine whether the criteria defined by the identified data path selection rule matches contextual information associated with the wireless communication device; and
in response to a determination that the criteria matches contextual information associated with the wireless communication device, selectively channel data operations associated with the selected mobile application to the data path of the preferred SIM.

4. The wireless communication device of claim 3, wherein the program code further enables the device to:
identify a default SIM from among the at least two SIMs; and
in response to a determination that the criteria do not match the contextual information associated with the wireless communication device, selectively channel data operations associated with the selected mobile application to the data path of the default SIM.

5. The wireless communication device of claim 3, wherein the program code further enables the device to:
identify the first SIM as a default SIM from among the at least two SIMs;
identify the second SIM as the preferred SIM;
identify contextual information that includes at least one of a current time or a current location;
channel data operations associated with the selected mobile application to the data path of the second SIM, in response to a determination that at least one of:
the current time is within a time window criterion defined by the identified data path selection rule; or
the current location is within a geographical area criterion defined by the identified data path selection rule.

6. The wireless communication device of claim 1, wherein the program code further enables the device to:
select the at least two mobile applications to run, including the first mobile application and the second mobile application;
identify a first setting that specifies the first SIM as the preferred SIM to which the selected first mobile application is assigned; and
identify a second setting that specifies the second SIM as the preferred SIM to which the selected second mobile application is assigned.

7. The wireless communication device of claim 1, wherein the program code further enables the device to:

in response identifying at least two selected mobile applications are assigned to different SIMs:
identify which of the first and second mobile applications is running as a background application and which application is running as a foreground application;
apply a quality of service (QoS) mechanism that throttles data throughputs of the background application; and
channel data operations associated with the foreground application to a data path of the preferred SIM specified in the identified setting corresponding to the foreground application.

8. A method comprising:
selecting at least one mobile application to run from among the at least two mobile applications on a wireless communication device, the device comprising:
at least two subscriber identification modules (SIMs), including a first SIM and a second SIM;
a memory storing multiple mobile applications for performing data operations, with at least two mobile applications among the multiple mobile applications assigned, based on a respective user-created setting for a corresponding one of the at least two mobile applications, to a user-selected one of the at least two SIMs for channeling respective data operations, wherein a first user-created setting for a first mobile application assigns data operations of the first mobile application for completion via a first data path comprising the first SIM, while a second user-created setting for a second mobile application assigns data operations of the second mobile application for completion via a second data path comprising the second SIM; and
a processor coupled to each of the at least two SIMs and the memory;
identifying, for each of the at least one mobile application, a user-created setting that specifies one of the at least two SIMs as a preferred SIM to which the selected at least one mobile application is assigned; and
channeling data operations associated with each of the at least one selected mobile application to a corresponding data path of the preferred SIM specified in the user-created setting for the corresponding at least one selected mobile application.

9. The method of claim 8, further comprising:
generating, for the selected mobile application, the setting specifying one of the at least two SIMs as the preferred SIM to which to assign the selected mobile application by:
displaying, on at least one electronic display of the wireless communication device, a menu item for assigning a selected mobile application to a preferred SIM from among the at least two SIMs; and
receiving a selection of one mobile application from among the multiple mobile applications;
receiving a selection of one preferred SIM to assign to the selected mobile application; and
assigning the selected mobile application to the selected preferred SIM.

10. The method of claim 8, further comprising:
identifying a data path selection rule that defines criteria for selecting the data path of the preferred SIM;
determining whether the criteria defined by the identified data path selection rule matches contextual information associated with the wireless communication device;

in response to a determination that the criteria matches contextual information associated with the wireless communication device, selectively channeling data operations associated with the selected mobile application to the data path of the preferred SIM.

11. The method of claim 10, further comprising:
identifying a default SIM from among the at least two SIMs; and
in response to a determination that the criteria do not match the contextual information associated with the wireless communication device, selectively channeling data operations associated with the selected mobile application to the data path of the default SIM.

12. The method of claim 10, further comprising:
identifying the first SIM as a default SIM from among the at least two SIMs;
identifying the second SIM as the preferred SIM;
identifying contextual information that includes a current time; and
channeling data operations associated with the selected mobile application to the data path of the second SIM, in response to a determination that at least one of:
the current time is within a time window criterion defined by the identified data path selection rule; or
the current location is within a geographical area criterion defined by the identified data path selection rule.

13. The method of claim 8, further comprising:
selecting at least two mobile applications to run, including a first mobile application and a second mobile application;
identifying a first setting that specifies the first SIM as the preferred SIM to which the selected first mobile application is assigned; and
identifying a second setting that specifies the second SIM as the preferred SIM to which the selected second mobile application is assigned.

14. The method of claim 8, further comprising:
in response identifying at least two selected mobile applications are assigned to different SIMs:
identifying which of the first and second mobile applications is running as a background application and which application is running as a foreground application;
applying a quality of service (QoS) mechanism that throttles data throughputs of the background application; and
channeling data operations associated with the foreground application to a data path of the preferred SIM specified in the identified setting corresponding to the foreground application.

15. A computer program product comprising:
a non-transitory computer readable storage device;
program code on the computer readable storage device that when executed by a processor associated with an electronic device, the program code enables the wireless communication device to provide the functionality of:
selecting at least one mobile application to run from among the at least two mobile applications on the electronic device, the device comprising:
at least two subscriber identification modules (SIMs), including a first SIM and a second SIM;
a memory storing multiple mobile applications for performing data operations, with at least two mobile applications among the multiple mobile applications assigned, based on a respective user-created setting for a corresponding one of the at least two mobile applications, to a user-selected one of the at least two SIMs for channeling respective data operations, wherein a first user-created setting for a first mobile application assigns data operations of the first mobile application for completion via a first data path comprising the first SIM, while a second user-created setting for a second mobile application assigns data operations of the second mobile application for completion via a second data path comprising the second SIM; and
the processor coupled to each of the at least two SIMs and the memory;
identifying, for each of the at least one mobile application, a user-created setting that specifies one of the at least two SIMs as a preferred SIM to which the selected at least one mobile application is assigned; and
channeling data operations associated with each of the at least one selected mobile application to a corresponding data path of the preferred SIM specified in the user-created setting for the corresponding at least one selected mobile application.

16. The computer program product of claim 15, wherein the program code comprises program code that, when executed by the processor, enables the electronic device to provide the functionality of:
generating, for the selected mobile application, the setting specifying one of the at least two SIMs as the preferred SIM to which to assign the selected mobile application by:
displaying, on at least one electronic display of the electronic device, a menu item for assigning a selected mobile application to a preferred SIM from among the at least two SIMs; and
receiving a selection of one mobile application from among the multiple mobile applications;
receiving a selection of one preferred SIM to assign to the selected mobile application;
assigning the selected mobile application to the selected preferred SIM.

17. The computer program product of claim 15, wherein the program code comprises program code that, when executed by the processor, enables the electronic device to provide the functionality of:
identify a default SIM from among the at least two SIMs;
identifying a data path selection rule that defines criteria for selecting the data path of the preferred SIM;
determining whether the criteria defined by the identified data path selection rule matches contextual information associated with the wireless communication device;
in response to a determination that the criteria matches contextual information associated with the wireless communication device, selectively channeling data operations associated with the selected mobile application to the data path of the preferred SIM; and
in response to a determination that the criteria do not match the contextual information associated with the wireless communication device, selectively channeling data operations associated with the selected mobile application to the data path of the default SIM.

18. The computer program product of claim 17, wherein the program code comprises program code that, when executed by the processor, enables the electronic device to provide the functionality of:

identifying the first SIM as a default SIM from among the at least two SIMs;

identifying the second SIM as the preferred SIM;

identifying contextual information that includes a current time; and channeling data operations associated with the selected mobile application to the data path of the second SIM, in response to a determination that at least one of:

the current time is within a time window criterion defined by the identified data path selection rule; or the current location is within a geographical area criterion defined by the identified data path selection rule.

19. The computer program product of claim 15, wherein the program code comprises program code that, when executed by the processor, enables the electronic device to provide the functionality of:

selecting at least two mobile applications to run, including a first mobile application and a second mobile application;

identifying a first setting that specifies the first SIM as the preferred SIM to which the selected first mobile application is assigned; and identifying a second setting in which the selected second mobile application is assigned to the second SIM as the preferred SIM.

20. The computer program product of claim 15, wherein the program code comprises program code that, when executed by the processor, enables the electronic device to provide the functionality of:

in response identifying at least two selected mobile applications are assigned to different SIMs:

identifying which of the first and second mobile applications is running as a background application and which application is running as a foreground application;

applying a quality of service (QoS) mechanism that throttles data throughputs of the background application; and channeling data operations associated with the foreground application to a data path of the preferred SIM specified in the identified setting corresponding to the foreground application.

* * * * *